United States Patent Office 2,842,573
Patented July 8, 1958

2,842,573

6-α METHYL 17 ALKYL 9α FLUORO 11 OXYGENATED 17β HYDROXY - 4 - ANDROSTEN - 3 - ONE COMPOUNDS AND PROCESS

Milton E. Herr and George B. Spero, Kalamazoo, Mich., assignors to The Upjohn Company, Kalamazoo, Mich., a corporation of Michigan No Drawing. Application October 21, 1957
Serial No. 691,123

11 Claims. (Cl. 260—397.45)

The present invention relates to new steroid compounds and is more particularly concerned with 6-methyl-9α-fluoro-11β,17β-dihydroxy-17α-alkyl-4-androsten-3-one, 6-methyl - 9α - fluoro - 17α - alkyl - 17β - hydroxy - 4 - androstene-3,11-dione, 17β-acylates thereof and a process for the production therefor.

This application is a continuation-in-part of application Serial No. 661,626 filed May 27, 1957.

The novel steroids and the process for the production therefor are represented by the following sequence of formulae:

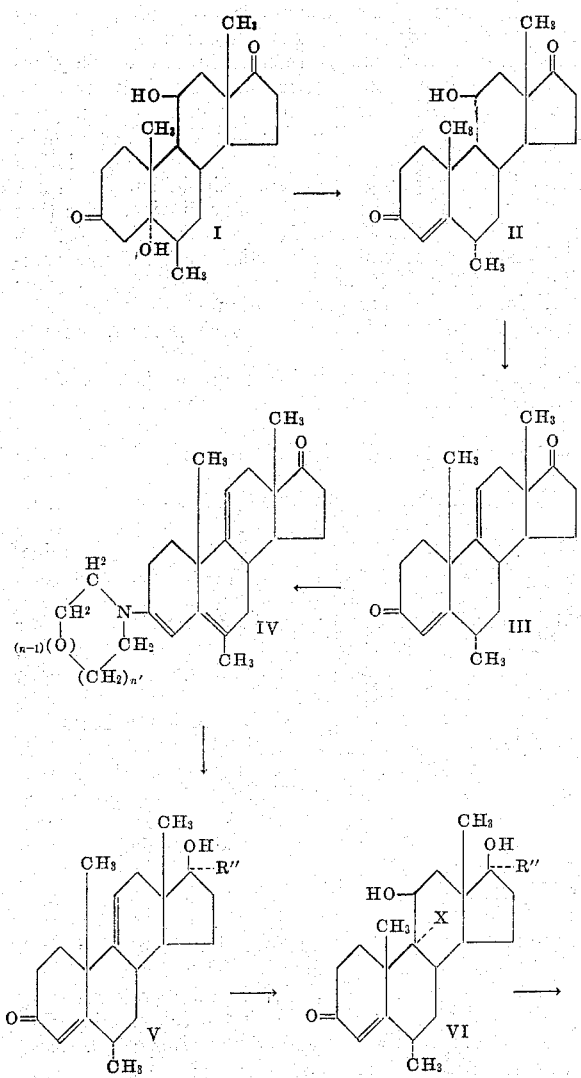

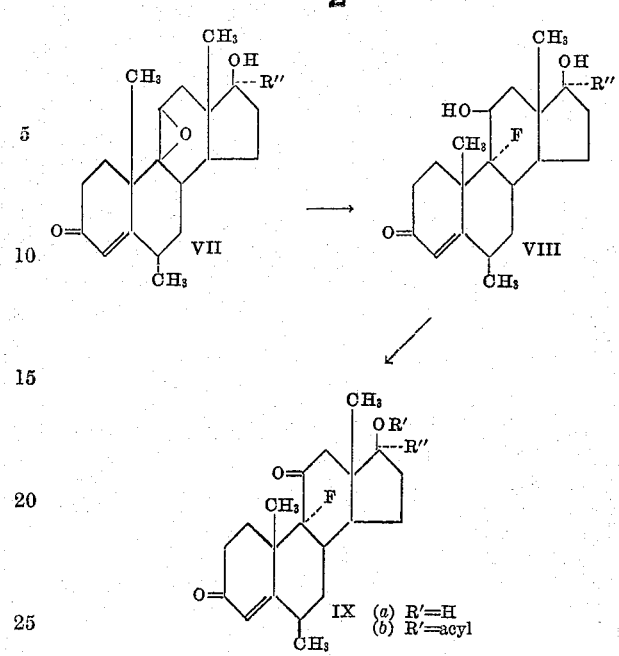

wherein n and n' are whole numbers from one to two, inclusive, wherein R' is selected from the group consisting of hydrogen and the acyl radical Ac of an organic carboxylic acid and preferably of a hydrocarbon carboxylic acid containing from one to eight carbon atoms, inclusive, wherein R" is selected from the group consisting of alkyl radicals containing less than seven carbon atoms and aryl, particularly phenyl, and wherein X is a halogen of atomic number between 17 and 35, inclusive.

The process of the instant invention comprises: treating 5α,11β-dihydroxy-6β-methylandrostane-3,17-dione (I) with a base such as sodium or potassium hydroxide to obtain 6 - methyl - 11β - hydroxy - 4 - androstene - 3,17-dione (II) mostly in the form of the 6α-epimer; dehydrating 6-methyl-11β-hydroxy-4-androstene-3,17-dione for example with N-haloacidamide or N-haloacidimide followed by treatment with sulfur dioxide, to obtain 6-methyl-4,9(11)-androstadiene-3,17-dione (III), treating the thus obtained 6-methyl-4,9(11)-androstadiene-3,17-dione with a cyclic secondary amine, such as pyrrolidine, morpholine, piperidine, homomorpholine, or the like, to obtain the corresponding 3-(N-cyclic tertiaryamino)-6-methyl-3,5,9(11)-androstatrien-17-one (IV); treating the thus produced enamine (IV) with a Grignard reagent such as methyl magnesium bromide, methyl magnesium iodide or ethyl, propyl, butyl magnesium bromide or iodide or phenyl magnesium iodide produces the corresponding 6α-methyl-17α-alkyl (or aryl)-9(11)-dehydrotestosterone (V); treating the thus obtained 6α-methyl-17α-alkyl (or aryl)-9(11)-dehydrotestosterone with a hypohalous acid, preferably produced in situ e. g. by reaction of a N-haloacylamide or N-haloacylimide wherein the halogen is preferably of atomic number 17 to 35, inclusive, and a mineral acid e. g. dilute sulfuric, dilute perchloric acid to obtain the corresponding 6α-methyl-9α - halo - 11β,17β-dihydroxy-17α-alkyl(or aryl)-4-androsten-3-one (VI); treating the thus produced 6α-methyl-9α-halo-11β,17β-dihydroxy-17α-alkyl(or aryl)-4-androsten-3-one with a mild base e. g., dropwise addition of 1/10 normal aqueous alkali base such as sodium hydroxide solution or sodium or potassium acetate to obtain 6α-methyl-9(11)-oxido-17β-hydroxy-17α-alkyl(or aryl)-4-androsten-3-one (VII) and treating the thus obtained 6α-methyl-9(11)-oxido-17β-hydroxy-17α-alkyl(or aryl)-4-androsten-3-one with a fluorinating agent such as hydrogen fluoride to obtain 6α-methyl-9α-fluoro-11β,17β-dihydroxy-17α-alkyl(or aryl)-4-androsten-3-one (6-methyl-9α-fluoro-11β - hydroxy - 17α - alkyl(or aryl) - testosterone) (VIII). Oxidation of 6-methyl-9α-fluoro-11β,17β-dihydroxy-17-alkyl(or aryl)-4-androsten-3-one with chromic acid in acetic acid or in a heterogeneous phase system such as benzene and an aqueous, acidified solution of a chromate such as sodium or potassium dichromate produces the corresponding 6α-methyl-9α-fluoro-11-keto-17α-alkyltestosterone of Formula IXa. Esterification of 6α-methyl-9α-fluoro-11-keto-17α-alkyltestosterone, as shown in Examples 9 through 12, yields the corresponding 6α-methyl-9α - fluoro - 11 - keto - 17α - alkyltestosterone 17β - acylate (IXb).

Hydrolyzing in aqueous alcohol the 3-(N-cyclic tertiary-amino) - 6 - methyl - 3,5,9(11) - androstatrien - 17 - one (IV) with aqueous ethanol or other aqueous alkanol results in the corresponding 6α-methyl-4,9(11)-androstadiene-3,17-dione.

It is an object of the present invention to provide 6-methyl - 9α - fluoro - 11β,17β - dihydroxy - 17α - alkyl (or aryl)-4-androsten-3-one and the 11-keto analogues thereof and 6 - methyl - 9α - fluoro - 17β - hydroxy - 17α-alkyl(or aryl) - 4 - androstene - 3,11 - dione. It is a particular object of the instant invention to provide 6α,17α - dimethyl - 9α - fluoro - 11β,17β - dihydroxy - 4-androsten - 3 - one and the 11 - keto analogue thereof. It is another object of the instant invention to provide a process for the production of 6-methyl-9α-fluoro-11β,17β - dihydroxy - 17α - alkyl (or aryl) - 4 - androsten-3-one and the 11-keto analogues thereof. Other objects of this invention will be apparent to those skilled in the art to which this invention pertains.

The new compounds, 6α,17α - dimethyl - 9α - fluoro-11β - hydroxytestosterone (6α,17α - dimethyl - 9α - fluoro-11β,17β - dihydroxy - 4 - androsten - 3 - one), 6α,17α-dimethyl-11-keto-9α-fluorotestosterone as well as other 6,17α - dialkyl and diaryl - 9α - fluoro - 11β - hydroxytestosterones and 11-ketotestosterones are compounds of high anabolic and low androgenic activity. These compounds are, therefore, useful to produce increase of protein-anabolism in patients with impaired nitrogen metabolism, especially in senile individuals without causing undesirable side effects such as virilization in women or increase of libido in men. The compounds have also central nervous systemic action, especially tranquillizing, sedative, hypnotic, and sedative potentiating activities. They are particularly useful when administered by injection especially as suspensions in oil or aqueous vehicles.

The 6α,17α - dimethyl - 9α - fluoro - 11β - hydroxytestosterone and 6α,17α - dimethyl - 9α - fluoro - 11 - ketotestosterone may be also used as sedative or antihypertensive agents in oral preparations, as tablets together with Evipal Sodium (hexyl barbital sodium). For symptomatic treatment in senile patients to increase protein anabolism, 6α,17α - dimethyl - 9α - fluoro - 11β - hydroxytestosterone and 6α,17β - dimethyl - 9α - fluoro - 11 - ketotestosterone may be used in either oral or injectable form.

The starting materials of the instant invention are 6-alkyl- and 6-aryl-5α,11β-dihydroxyandrostane-3,17-diones, illustratively 6 - methyl-5α,11β-dihydroxyandrostane-3,17-dione, prepared as shown by Preparations 1 through 4.

In carrying out the process of the instant invention 5α,11β - dihydroxy - 6β - methylandrostane - 3,17-dione is dehydrated to give 6 - methyl - 11β - hydroxy - 4-androstene - 3,17 - dione. The dehydration of 5α,11β-dihydroxy-6β-methylandrostane-13,17-dione can be carried out with either an acid, base, thionyl chloride and the like. Addition of alkali metal bases in aqueous solution to the solution of 5α,11β - dihydroxy - 6β - methylandrostane - 3,17-dione in a water-miscible organic solvent such as methanol, ethanol, tertiary butyl alcohol, dioxane or the like is preferred. In the preferred embodiment of the present invention tenth normal aqueous solutions of sodium or potassium hydroxide is added to the solution of 5α,11β - dihydroxy - 6β - methylandrostane - 3,17-dione, dissolved in a lower alkyl, water-miscible alcanol such as methanol, ethanol, propanol, tertiary butyl alcohol, and the reaction mixture is heated from ten minutes to two hours. The product after cooling and neutralizing of the solution is isolated in any conventional manner, such as by evaporating the alcohol, and recovering water-insoluble 6 - methyl - 11β - hydroxy - 4 - androstene-3,17-dione (II) mostly as the 6α - epimer on a filter. Purification if desired is made by recrystallization from organic solvents, such as methanol, ethanol, acetone, dioxane, benzene, ethyl acetate, Skellysolve B hexanes mixtures thereof and the like, or by any other conventional procedure.

The thus obtained 6 - methyl - 11β - hydroxy - 4 - androstene-3,17-dione (II) is then dehydrated to give 6-methyl-4,9(11)-androstadiene-3,17-dione (III) by any known manner, e. g. by phosphorus oxychloride in pyridine, sulfuric acid in acetic acid solution, N-haloacylamides or imides and sulfur dioxide, or the like. In a preferred embodiment of the present invention the 6-methyl-11β-hydroxy-4-androstene-3,17-dione, dissolved in pyridine, or other organic tertiary amines, is reacted with an N-haloacylamide or N-haloacylimide, e. g. N-bromoacetamide, N-chloroacetamide, N-chlorosuccinimide, N-bromosuccinimide, N-iodosuccinimide, N-bromophthalimide, 3-bromo-5,5-dimethylhydantoin and 1,3-dibromo - 5,5-dimethylhydantoin, in excess of a molar equivalent, calculated on the starting hydroxy steroid. The reaction is generally carried out between minus forty and plus seventy degrees centigrade with room temperature (fifteen to thirty degrees centigrade) preferred in an essentially anhydrous medium. The reaction time is usually less than one hour. Thereafter into this reaction mixture, preferably, between minus and plus thirty degrees centigrade, sulfur dioxide gas is passed until no color with acidified starch-iodine paper is obtained. Liquid sulfur dioxide can be used instead of gaseous sulfur dioxide. The thus obtained 6α - methyl - 4, 9(11)-androstadiene - 3,17-dione is recovered from the reaction mixture by conventional means, such as addition of water and collecting the precipitated compound by filtration or extraction with organic water-immiscible solvents, such as ether, benzene, methylene dichloride, chloroform and the like. Recrystallization of the crude material, from alcohols, such as methanol, ethanol, tertiary butyl alcohol, ethyl acetate, Skellysolve B hexanes, heptanes or the like gives the pure 6α - methyl - 4,9(11)-androstadiene - 3,17 - dione (III).

The thus obtained 6α - methyl - 4,9(11) - androstadiene-3,17-dione (III) is converted to the 3-enamine, usually with cyclic secondary amine selected from pyrrolidine, morpholine and piperidine, with pyrrolidine preferred. As solvents can be used alkanols, such as methyl alcohol, ethyl, propyl, isopropyl, butyl, hexyl, octyl alcohol, or the like, or benzene, toluene, dioxane, tetrahydrofuran, or the like. Preferred are water-miscible solvents such as methanol or ethanol since in this case no provision to eliminate the water, produced in the reaction, is necessary.

As temperature of reaction, the range between fifty degrees centigrade and the refluxing point of the mixture are generally used. However, the reaction also takes place at lower temperatures such as between room temperature (about 25 degrees) and fifty degrees centigrade.

The reagent, a cyclic secondary amine, is generally used in an amount about equal to the theoretical amount required and up to three or four times the theoretical. An excess of about one and one-half to three times the theoretical amount required is generally preferred.

The time of reaction depends upon the reaction condition, especially the solvent and the temperature used. In hot alcohol, hot methanol or ethanol, reaction begins immediately and is almost completed upon cooling of the reaction mixture to room temperature. In benzene the reaction time is usually held between fifteen minutes and two hours at refluxing temperature. Since the reation product is often insoluble in the solvent, especially when methanol is used, the product at the termination of the reaction is recoverable by filtration and can be purified by washing and recrystallization to give the pure 3 - (N-tertiarycyclic amino)-6α-methyl-3,5,9(11)-androstatrien-17-one (IV).

The thus obtained 3-(N-tertiarycyclic amino)-6-methyl-3,5,9(11)-androstatrien-17-one is alkylated at the 17-position either with a Grignard reagent, or with an olefin or acetylene in the presence of a base catalyst such as potassium or sodium isopropoxide, tertiary butoxide, and the like. As Grignard reagent, especially methyl, ethyl, and propyl magnesium bromide or iodide, with methyl magnesium iodide or bromide preferred, are used in either benzene or tetrahydrofuran solution. As other conditions, such as temperature, reaction time, or the like, the conventional conditions commonly used in Grignard reactions can be used here. At the end of the reaction, the Grignard addition product is decomposed with water using generally neutral conditions. Without isolating and purifying the thus produced 3-(N-tertiarycyclic amino) - 6α-methyl-3,5,9(11)-17α-alkyl(aryl)-androstatrien-17β-ol (V) can then be hydrolyzed under either acidic or basic conditions, preferably in a buffered solution, for example, sodium or potassium acetate and sodium or potassium hydroxide or acetic acid in the presence of the sodium or potassium acetate. Hydrolysis of the enamine group can be carried out at room temperature, but preferably at elevated temperature such as the reflux temperature of the mixture. After termination of the reaction, the material, 6α-methyl-17α-alkyl-(aryl)-17β-hydroxy-4,9(11)-androstadien-3 - one, is isolated in conventional manner, for example, in case of solid material by filtration or, if no solid material separates from the mixture, by extraction with water-immiscible solvents such as methylene dichloride, chloroform, ether, benzene, or the like.

If in the two alkylation reactions (the preparation of the starting material I and the alkylation of compound IV) other agents than methylating agents were used or even phenyl Grignards, other 6α,17β-dialkyl-, 6α,17β-diaryl, or mixed alkyl and aryl 6α,17β-disubstituted 17-hydroxy-4,9(11)-androstadien-3 - ones are obtained (V).

The thus obtained 6,17-dimethyl-11β-hydroxy-9(11)-dehydrotestosterone (V) is converted to the corresponding 6α,17α-dimethyl-9α-halo-11β,17β-dihydroxy-4-androsten-3-one (IX), wherein the 9α-halo group is 9α-chloro or 9α-bromo with 9α-bromo preferred, by reacting V with a hypohalous acid, such as hypochlorous or hypobromous acid. The hypohalous acid is usually added by reacting an N - haloacylamide or an N - haloacylimide with an acid to produce the hypohalous acid in situ.

In the preferred embodiment of the invention the steroid, illustratively a 6α,17-dimethyl- or other dialkyl-17β-hydroxy-9(11)-dehydrotestosterone (V) is dissolved in an organic solvent such as methylene chloride, tertiary butyl alcohol, dioxane, tertiary amyl alcohol, or the like, and reacted at room temperature with the hypohalous, e. g. hypobromous or hypochlorous acid releasing agent in the presence of an acid. Such hypohalous acid releasing agents include N-bromoacetamide, N - chloroacetamide, N-bromosuccinimide, or the like, in the presence of water and an acid such as perchloric acid, dilute sulfuric acid, or the like.

The reaction is usually carried out at room temperature, between fifteen to thirty degrees centigrade. However, lower or higher temperatures are operative for the process. The hypohalous acid releasing agent is generally used in one molar or slightly in excess, for example, 25 percent excess amounts compared to mole of steroid. A large excess of the hypohalous acid releasing agent, while operative, is undesirable since the excess of hypohalous acid has a tendency to react with other positions of the molecule. The reaction period is rather short and may vary between about four to five minutes to one hour. At the end of the reaction time excess of hypohalous acid is destroyed by the addition of sodium sulfite or other sulfites or hydrosulfites.

The thus produced product, 6α,17α-dimethyl-9α-halo-11β,17β-dihydroxy-4-androsten-3-one or other 6α,17α-dialkyl(diaryl) - 9α - halo - 11β,17β - dihydroxy-4-androsten-3-one (VI), wherein the halogen atom is of atomic weight between 33 and eighty (atomic number 17 to 35), is isolated from the reaction mixture by adding excess of water and extracting the compound with organic solvents or by recovering the precipitated compound by filtration. The crude product thus obtained can be recrystallized from organic solvents, such as acetone, Skellysolve B hexane hydrocarbons, or the like to give pure 6α,17α-dimethyl- or, respectively, 6α,17α-dialkyl- or 6α,17α-diaryl-9α-halo-11β,17β-dihydroxy-4-androsten-3-one (VI).

Oxidizing the 6α,17α-dimethyl- or, respectively, 6α,17α-dialkyl- or 6α,17α-diaryl-9α-halo-11β,17β-dihydroxy-4-androsten-3-one with chromic acid produces the corresponding pharmaceutically active 6α,17α-dialkyl- or 6α,17α - aryl - 9α - halo - 17β - hydroxy - 4 - androstene - 3,11-dione.

In order to obtain the 9α-fluoro compounds, the 9β,-11β-epoxy intermediates of the before-mentioned compounds, 6α,17α-dimethyl- or, respectively, other 6α,17α-dialkyl- or 6α,17α - aryl - 9β,11β - oxido - 17β - hydroxy - 4-androsten-3-one (VII) is prepared.

In carrying out this reaction a 6α,17α-dimethyl or other 6α,17α-dialkyl- or 6α,17α - diaryl-9α-halo-11β,17β-dihydroxy-4-androsten-3-one is treated in solution with a base. The bases useful for the cyclization include aqueous sodium hydroxide, anhydrous potassium acetate, sodium bicarbonate, sodium acetate, or the like, with aqueous sodium hydroxide preferred. Solvents such as methanol, ethanol, acetone, tertiary butyl alcohol, or the like, can be used. The reaction time is between one-half hour and 24 hours; generally a period between one-half and one hour is sufficient. The thus obtained 6α,17α-dimethyl or 6α,17α - dialkyl - or 6α,17α - diaryl-9β,11β-oxido-17β-hydroxy-4-androsten-3-one is isolated from the reaction mixture by diluting the reaction mixture with excess water and filtering the product when crystalline, or by extracting with methylene chloride or other water-immiscible solvents such as ether, Skellysolve B hexanes, pentanes, benzene, ethyl acetate, chloroform, carbon tetrachloride, or the like. Evaporation of the solvent from the extracts produces the 6α,17α-dimethyl- or other 6α,17α-dialkyl- or 6α,17α-diaryl-9β,11β-oxido-17β-hydroxy-4-androsten-3-one (VII).

The thus obtained 6α,17α-dimethyl or other 6α,17α - dialkyl- or 6α,17α - diaryl - 9β,11β - oxido - 17β - hydroxy-4-androsten-3-one is thereupon reacted with a fluorinating agent, such as hydrofluoric acid, potassium bifluoride ($KHF_2$) and an acid such as acetic acid, or the like. As solvents for this reaction, methylene chloride, tetrahydrofuran, ethylene dichloride, chloroform, carbon tetrachloride, or the like are useful, with methylene chloride and tetrahydrofuran preferred. In case a metal fluoride such as potassium bifluoride is used acetic acid or other organic acids are used as solvent. The reaction is carried out preferably with stirring at room temperature (twenty to thirty degrees centigrade) when methylene chloride is used as solvent, and at low temperatures, zero to minus eighty degrees centigrade when methylene chloride and tetrahydrofuran is used. With methylene chloride at room temperature aqueous (48 percent) hydrofluoric acid is generally used, while with methylene chloride and tetrahydrofuran at low temperatures liquid hydrogen fluoride is used. The period of reaction is from one to 24 hours with a period from one to twelve hours usually sufficient. After the reaction is terminated, the mixture is poured into water and neutralized with a dilute base such as sodium bicarbonate, potassium bicarbonate, or the like. Excess of strong bases can also be used. The reaction mixture is then extracted with a water-immiscible solvent such as methylene chloride, the organic layer is separated from the water mixture, washed with water, dried and evaporated to give the crude $6\alpha,17\alpha$-dimethyl or other $6\alpha,17\alpha$-dialkyl- or $6\alpha,17\alpha$-diaryl-$9\alpha$-fluoro-$11\beta,17\beta$-dihydroxy-4-androsten-3-one (VIII). The thus obtained crude compound can be purified through recrystallization or chromatography.

Oxidation of $6\alpha,17\alpha$-dimethyl or other $6\alpha,17\alpha$-dialkyl- or $6\alpha,17\alpha$-diaryl-$9\alpha$-fluoro-$11\beta,17\beta$-dihydroxy-4-androsten-3-one in conventional manner, for example, with chromic anhydride or an alkali chromate, in solution such as in acetic acid, at temperatures between zero and forty degrees, provides the corresponding $6\alpha,17\alpha$-dimethyl or other $6\alpha,17\alpha$-dialkyl- or $6\alpha,17\alpha$-diaryl-$9\alpha$-fluoro-$17\beta$-hydroxy-4-androstene-3,11-dione (IXa).

Treating the thus produced $6\alpha,17\alpha$-dimethyl- or other $6\alpha,17\alpha$-dialkyl- or $6\alpha,17\alpha$-diaryl-$9\alpha$-fluoro-$17\beta$-hydroxy-4-androstene-3,11-dione with an acid anhydride, such as acetic, propionic, butyric, valeric, hexanoic, benzoic, or phenylacetic anhydride, at reflux temperature produces the corresponding $17\beta$-ester of $6\alpha,17\alpha$-dialkyl- or $6\alpha,17\alpha$-diaryl - $9\alpha$ - fluoro-$17\beta$-hydroxy-4-androstene-3,11-dione (IXb). If acyl halides are used in the esterification, the 3-enol, $17\beta$-diacylates of $6\alpha,17\alpha$-dimethyl- or other $6\alpha,17\alpha$ - dialkyl- or $6\alpha,17\alpha$-diaryl-$9\alpha$-fluoro-$17\beta$-hydroxy-4-androstene-3,11-dione are obtained which by hydrolysis with a base, for example $\frac{1}{10}$ normal sodium hydroxide at room temperature, can be hydrolyzed to give the $17\beta$-monoester.

The following preparations and examples are illustrative of the product and the process of the present invention and are not to be construed as limiting.

PREPARATION 1

*5,6 - oxido - 11β - hydroxyandrostene-3,17-dione 3,17-bis-(ethylene ketal)*

A solution of 20.48 grams of $11\beta$-hydroxy-5-androstene-3,17-dione 3,17-bis-(ethylene ketal) in 400 milliliters of chloroform was added with stirring to an ice cooled mixture of forty milliliters of forty percent peracetic acid and four grams of sodium acetate. The mixture was stirred in an ice-water bath for 105 minutes and 400 milliliters of chloroform was then added. Thereafter 400 milliliters of saturated sodium bicarbonate solution was added and after mixing thoroughly the organic layer was separated from the aqueous layer.

The organic layer was thereupon washed twice with water, dried over anhydrous sodium sulfate and concentrated to 100 milliliters on a steam bath. Thereafter 100 milliliters of benzene was added, the mixture was concentrated and cooled at room temperature to give 14.42 grams of crude 5,6-oxido-$11\beta$-hydroxyandrostane-3,17-dione 3,17-bis-(ethylene ketal) of melting point 226–232 degrees centigrade. A sample was recrystallized from acetone to give pure 5,6-oxido-$11\beta$-hydroxyandrostane-3,17-dione 3,17-bis-(ethylene ketal) of melting point 225 to 230 degrees centigrade and rotation $[\alpha]_D$ of 58 degrees in chloroform.

*Analysis.*—Calcd. for $C_{23}H_{34}O_6$: C, 67.95; H, 8.43. Found: C, 68.16; H, 8.80.

In the same manner given in Preparation 1, treating other bis-alkyl ketals with peracetic acid or other peracid, usually at low temperatures gives the corresponding 5,6-oxido-$11\beta$-hydroxyandrostane-3,17-dione 3,17-bis-(alkylene ketal). Representative such diketals comprise the 5,6-oxido-$11\beta$-hydroxyandrostane-3,17-dione 3,17-bis-(1,3-propylene ketal), 3,17-bis-(2,3-butylene ketal), 3,17-bis-(1,2-butylene ketal), 3,17-bis-(1,3-butylene ketal), and the like.

PREPARATION 2

*5α,11β-dihydroxy-6β-methylandrostane-3,17-dione 3,17-bis-(ethylene ketal)*

A solution of 4.07 grams (0.01 mole) of 5,6-oxido-$11\beta$-hydroxyandrostane-3,17-dione 3,17-bis-(ethylene ketal), dissolved in 250 milliliters of tetrahydrofuran, was added under a nitrogen atmosphere during a period of ten minutes with mechanical stirring to a mixture of fifty milliliters of four molar methyl magnesium bromide solution in diethyl ether. The mixture was then distilled until the vapor temperature at the head of the distilling column was sixty degrees centigrade at which point the downward condenser was replaced with a reflux condenser protected with a calcium chloride tube. The mixture was thereupon heated at reflux for a period of seventeen hours whereafter the reaction mixture was cooled to room temperature and then in an ice-water bath. With the stirrer operating, 200 milliliters of benzene was added and then 100-milliliters of water cautiously from a dropping funnel. The liquid phase was decanted from the sludge residue into a separatory funnel. The residue was washed with two 100-milliliter portions of benzene which were in turn added to the before-obtained liquid phase. The combined liquid phase was washed with two 100-milliliter portions of water, 100 milliliters of ammonium chloride solution, 100 milliliters of water and dried over sodium sulfate. The solvent was removed under reduced pressure to leave a solid residue and the solid residue was crystallized from dilute acetone to give 3.43 grams (81 percent) of $5\alpha,11\beta$-dihydroxy-$6\beta$-methylandrostane-3,17-dione 3,17-bis-(ethylene ketal) of melting point 185 to 190 degrees centigrade. A sample, recrystallized from dilute acetone, ether-Skellysolve B and finally methylene chloride-Skellysolve B hexanes, had a melting point of 190 to 192 degrees centigrade and rotation $[\alpha]_D$ of minus 31 degrees in chloroform.

*Analysis.*—Calcd. for $C_{24}H_{38}O_6$: C, 68.22; H, 9.07. Found: C, 68.37; H, 9.42.

PREPARATION 3

Substituting in Preparation 2 for the methyl magnesium bromide:

(a) Ethyl magnesium bromide yields $5\alpha,11\beta$-dihydroxy-$6\beta$-ethylandrostane-3,17-dione 3,17-bis-(ethylene ketal);

(b) Propyl magnesium iodide yields $5\alpha,11\beta$-dihydroxy-$6\beta$-propylandrostane-3,17-dione 3,17-bis-(ethylene ketal);

(c) Isopropyl magnesium bromide yields $5\alpha,11\beta$-dihydroxy-$6\beta$-isopropylandrostane-3,17-dione 3,17-bis-(ethylene ketal);

(d) Butyl magnesium bromide yields $5\alpha,11\beta$-dihydroxy-$6\beta$-butylandrostane-3,17-dione 3,17-bis-(ethylene ketal);

(e) Pentyl magnesium bromide yields $5\alpha,11\beta$-dihydroxy-$6\beta$-pentylandrostane-3,17-dione 3,17-bis-(ethylene ketal);

(f) Hexyl magnesium bromide yields $5\alpha,11\beta$-dihydroxy-$6\beta$-hexylandrostane-3,17-dione 3,17-bis-(ethylene ketal);

(g) Phenyl calcium iodide yields $5\alpha,11\beta$-dihydroxy-$6\beta$-phenylandrostane-3,17-dione 3,17-bis-(ethylene ketal).

In the same manner as shown in Preparations 2 and 3, the 6-alkyl and 6-aryl-$5\alpha,11\beta$-dihydroxyandrostane-3,17-dione 3,17-bis-ketals can be prepared from the 5,6-oxido-$11\beta$-hydroxyandrostane-3,17-dione 3,17-bis-ketals in which the alkylene group may be 1,2-propylene, 1,3-propylene, 1,2-butylene, 2,3-butylene, and the like.

PREPARATION 4

*5α,11β-dihydroxy-6β-methylandrostane-3,17-dione*

A solution of 3.74 grams of $5\alpha,11\beta$-dihydroxy-$6\beta$-methylandrostane-3,17-dione 3,17-bis-(ethylene ketal), dissolved in ninety milliliters of acetic acid and thirty milliliters of water, was warmed on a steam bath for a period of forty minutes and thereupon poured under stirring onto 360 grams of cracked ice. To this mixture seventy grams of sodium bicarbonate was carefully added, portionwise, and the insoluble product, thus obtained, was recovered by filtration, washed well with water and dried over anhydrous sodium sulfate to give 260 grams of crude $5\alpha,11\beta$-dihydroxy-6-methylandrostane-3,17-dione (88 percent yield). Recrystallization of the crude material gave a pure $5\alpha,11\beta$-dihydroxy-$6\beta$-methyl-androstane-3,17-dione of melting point 230 to 235 degrees (with decomposition) and rotation $[\alpha]_D$ plus 66 degrees in ethanol.

*Analysis.*—Calcd. for $C_{20}H_{30}O_4$: C, 71.83; H, 9.04. Found: C, 71.53; H, 8.97.

In the same manner given in Preparation 4, hydrolyzing with aqueous acetic acid, or an ethanolic aqueous mineral acid such as hydrochloric acid, sulfuric acid in low concentration, e. g. as two to five percent solution in aqueous alcohol other $5\alpha,11\beta$-dihydroxy-$6\beta$-alkyl- or $5\alpha,11\beta$-dihydroxy-$6\beta$-arylandrostane-3,17-dione 3,17-bis-(alkylene ketals) yields the corresponding $5\alpha,11\beta$-dihydroxy-$6\beta$-alkyl-androstane-3,17-diones or the corresponding $5\alpha,11\beta$-dihydroxy-$6\beta$-arylandrostane-3,17-diones. Representative $5\alpha,11\beta$-dihydroxy-$6\beta$-alkylandrostane-3,17-diones or the 6-aryl analogues thereof comprise: $5\alpha,11\beta$-dihydroxy-$6\beta$-ethylandrostane-3,17-dione, $5\alpha,11\beta$-dihydroxy-$6\beta$-propylandrostane-3,17-dione, $5\alpha,11\beta$-dihydroxy - $6\beta$ - isopropyl androstane-3,17-dione, $5\alpha,11\beta$-dihydroxy-$6\beta$-butylandrostane-3,17-dione, $5\alpha,11\beta$-dihydroxy-$6\beta$-isobutylandrostane-3,17-dione, $5\alpha,11\beta$-dihydroxy-$6\beta$-pentylandrostane-3,17-dione, $5\alpha,11\beta$-dihydroxy-$6\beta$-hexylandrostane-3,17-dione, $5\alpha,11\beta$-dihydroxy-$6\beta$-phenylandrostane-3,17-dione, and the like.

EXAMPLE 1

*$6\alpha$-methyl-$11\beta$-hydroxy-4-androstene-3,17-dione*

One-half gram of $6\beta$-methyl-$5\alpha,11\beta$-dihydroxyandrostane-3,17-dione, dissolved in fifty milliliters of methanol and ten milliliters of one-tenth normal sodium hydroxide, was heated at reflux for a period of one hour. The mixture was then cooled and neutralized by the addition of acetic acid. After dilution with ten milliliters of water, the mixture was heated to distill off the solvent until the final volume was approximately thirty milliliters. Upon cooling there was obtained 0.32 gram of $6\alpha$-methyl-$11\beta$-hydroxy-4-androstene-3,17-dione which was recrystallized from alcohol to have a melting point of 228 to 233 degrees centigrade and rotation $[\alpha]_D$ of plus 169 degrees in ethanol.

In the same manner shown in Example 1, dehydrating with a base such as sodium hydroxide, potassium hydroxide, barium hydroxide or the like in aqueous alcoholic solutions such as in methanol, ethanol, tertiary butyl alcohol and water, other $5\alpha,11\beta$-dihydroxy-$6\beta$-alkyl- or $5\alpha,11\beta$-dihydroxy-$6\beta$-arylandrostane-3,17-diones give the corresponding $6\alpha$-alkyl- or $6\alpha$-aryl-$11\beta$-hydroxy-4-androstene-3,17-diones. Representative such $6\alpha$-alkyl- or $6\alpha$-aryl-$11\beta$-hydroxy-4-androstene-3,17-diones obtained in this manner include the $6\alpha$-ethyl-$11\beta$-hydroxy-4-androstene-3,17-dione, $6\alpha$-propyl-$11\beta$-hydroxy-4-androstene-3,17-dione, $6\alpha$-isopropyl-$11\beta$-hydroxy-4-androstene-3,17-dione, $6\alpha$-butyl-$11\beta$-hydroxy-4-androstene-3,17-dione, $6\alpha$-isobutyl-$11\beta$-hydroxy-4-androstene-3,17-dione, $6\alpha$-pentyl-$11\beta$-hydroxy-4-androstene-3,17-dione, $6\alpha$-hexyl-$11\beta$-hydroxy-4-androstene-3,17-dione, $6\alpha$-phenyl-$11\beta$-hydroxy-4-androstene-3,17-dione, and the like.

EXAMPLE 2

*$6\alpha$-methyl-$4,9(11)$-androstadiene-3,17-dione*

A solution was prepared containing 0.244 gram of $6\alpha$-methyl-$11\beta$-hydroxy-4-androstene-3,17-dione in three milliliters of pyridine. To this solution was added 0.20 gram of N-bromoacetamide and the mixture stirred under nitrogen atmosphere at 26 degrees centigrade for a period of fifteen minutes. While cooling the mixture in an ice-water bath, sulfur dioxide gas was passed into the mixture through a capillary tube, until the mixture gave a negative test of starch-iodide paper acidified with dilute sulfuric acid. Upon diluting the reaction mixture with forty milliliters of water, the product separated and was recovered by filtration, washed with water, dried over anhydrous sodium sulfate and recrystallized from acetone to give $6\alpha$-methyl-$4,9(11)$-androstadiene-3,17-dione of melting point 193 to 196 degrees centigrade and rotation $[\alpha]_D$ of plus 173 degrees in chloroform.

*Analysis.*—Calculated for $C_{20}H_{26}O_2$: C, 80.50; H, 8.78. Found: C, 80.51; H, 8.99.

In the same manner as shown in Example 2, treating other $6\alpha$-alkyl- or $6\alpha$-aryl-$11\beta$-hydroxy-4-androstene-3,17-diones with N-bromoacetamide, N-chloroacetamide, N-bromosuccinimide, N-chlorosuccinimide and the like and thereafter with gaseous sulfur dioxide gives the corresponding $6\alpha$-alkyl- or $6\alpha$-aryl-$4,9(11)$-androstadiene-3,17-dione. Representative such $6\alpha$-alkyl-$4,9(11)$-androstadiene-3,17- diones or $6\alpha$-aryl-$4,9(11)$-androstadiene-3,17-diones include $6\alpha$-ethyl-$4,9(11)$-androstadiene-3,17-dione, $6\alpha$-propyl-$4,9(11)$-androstadiene-3,17-dione, $6\alpha$-isopropyl-$4,9(11)$-androstadiene-3,17-dione, $6\alpha$-butyl-$4,9(11)$-androstadiene-3,17-dione, $6\alpha$-isobutyl-$4,9(11)$-androstadiene-3,17-dione, $6\alpha$-pentyl-$4,9(11)$-androstadiene-3,17-dione, $6\alpha$-hexyl-$4,9(11)$-androstadiene-3,17-dione, $6\alpha$-phenyl-$4,9(11)$-androstadiene-3,17-dione and the like.

EXAMPLE 3

*$6$-methyl-$3$-$(N$-pyrrolidinyl$)$ - $3,5,9(11)$ - androstatrien-$17$-one*

To a solution of $6\alpha$-methyl-$4,9(11)$-androstadiene-3,17-dione in ten milliliters of hot methanol was added 0.5 milliliter of pyrrolidine. Precipitation was induced by scratching with a glass rod. The mixture was brought quickly to a boil and allowed to cool at room temperature. It was further cooled to minus fifteen degrees centigrade for one hour and the product then recovered by filtration, washed with cold methanol and dried; the thus obtained product, 0.491 gram of 6-methyl-3-(N-pyrrolidinyl)-3,5,9(11)-androstatrien-17-one, had a melting point of 140 to 145 degrees centigrade with decomposition and rotation $[\alpha]_D$ of minus 189 degrees in chloroform;

$$\lambda_{max}^{ether}\ 285\ m\mu\ (a_M\ 22,0752)$$

*Analysis.*—Calcd. for $C_{24}H_{33}NO$: C, 81.99; H, 9.46; N, 3.98. Found: C, 81.89; H, 9.36; N, 4.57.

In the same manner as shown in Example 3, reacting other $6\alpha$-alkyl- or $6\alpha$-aryl-$4,9(11)$-androstadiene-3,17-diones with a secondary amine such as pyrrolidine, morpholine, piperidine, homomorpholine, and the like gives the corresponding 6-alkyl-3-(N-cyclictertiaryamino)-3,5,-9(11)-androstatrien-17-one or 6-aryl-3-(N-cyclictertiaryamino)-3,5,9(11)-androstatrien-17-one wherein the alkyl group may be methyl, ethyl, propyl, isopropyl, butyl, isobutyl, pentyl, hexyl and the aryl group may be phenyl or the like and wherein the tertiaryamino radical may be pyrrolidinyl, piperidinyl, morpholinyl, homomorpholinyl, or the like.

EXAMPLE 4

*$6\alpha,17\alpha$-dimethyl-$17\beta$-hydroxy-$4,9(11)$-androstadien-$3$-one*

To a mixture of 25 milliliters of three molar methylmagnesium bromide in ether, stirred under a nitrogen atmosphere, was added, over a period of ten minutes, a solution of 1.36 grams of 6-methyl-3-(N-pyrrolidinyl)-3,5,9(11)-androstatrien-17-one, dissolved in 25 milliliters of dry tetrahydrofuran. The mixture was distilled until the vapor temperature was 55 degrees centigrade and then heated at reflux for seventeen hours. While cooling in an ice bath, twenty milliliters of water was added dropwise with caution, followed by fifty milliliters of methanol and twelve milliliters of acetic acid to dissolve all solids. The mixture was then made basic with ten percent sodium hydroxide solution (fifty milliliters) and heated at reflux for a period of 45 minutes. The mixture was then acidified with acetic acid and concentrated in vacuo. The product was extracted with methylene chloride. The solution was washed with water, dilute sodium hydroxide, water, dried over anhydrous sodium sulfate and the solvent removed by distillation. The orange residue was then dissolved in 25 milliliters of benzene and chromatographed over 25 grams of activated alumina. The column was eluted with Skellysolve B hexane-acetone mixtures containing four, seven, ten and fifteen percent acetone. The fractions which were oils or semicrystalline were examined by infrared analysis. The four percent acetone fractions were mainly starting materials; the seven, ten and fifteen percent acetone fractions were chiefly product and amounted to 0.673 gram of amorphous material which was used directly for the next step without further purification. A recrystallized fraction from ethanol of 6α,17α-dimethyl-17β-hydroxy-4,9(11)-androstadien-3-one melted at 135 to 140 degrees centigrade.

In the same manner as shown in Example 4, reacting 6-methyl-3-(N-tertiaryamino) - 3,5,9(11)-androstatrien-17-ones with alkyl magnesium bromides or iodides results in the corresponding 6α-methyl-17α-alkyl-17β-hydroxy-4,9(11)-androstadien-3-one. Using 6-alkyl- or 6-aryl-3-(N - tertiaryamino) - 3,5,9(11) - androstatrien-17-ones wherein the alkyl or aryl group is ethyl, propyl, isopropyl, butyl, isobutyl, pentyl, hexyl, or phenyl, other 6α,17α-dialkyl-, 6α-alkyl-17α-aryl-, 6α-aryl- or 6α,17α-diaryl-17α-alkyl-17β-hydroxy-4,9(11)-androstadien-3-ones are produced such as 6α,17α-diethyl-17β-hydroxy-4,9(11)-androstadien-3-one, 6α-methyl-17α - ethyl-17β - hydroxy-4,9(11) - androstadien-3-one, 6α-methyl-17α-phenyl-17β-hydroxy - 4,9(11) - androstadien - 3 - one, 6α-phenyl-17α-methyl-17β-hydroxy-4,9(11)-androstadien-3-one 6α,17α-diphenyl - 17β-hydroxy-4,9(11) - androstadien-3-one, and the like.

EXAMPLE 5

6α,17α-dimethyl-9α-bromo-11β,17β-dihydroxy-4-androsten-3-one

Crude 6α,17α-dimethyl-17β-hydroxy-4,9(11)-androstadien-3-one (0.60 gram), dissolved in twelve milliliters of acetone, was cooled in a water bath at fifteen degrees centigrade and treated with 0.30 gram of N-bromoacetamide in six milliliters of water. Then twelve milliliters of 0.8 normal perchloric acid was added dropwise with stirring. A precipitate of needles separated and after fifteen minutes the excess reagent was destroyed with sodium sulfite solution. After cooling to zero degrees centigrade for a period of thirty minutes, the product, 6α,17α-dimethyl-9α-bromo - 11β,17β-dihydroxy-4-androsten-3-one, was recovered, washed with water and dried. The yield of product was 0.61 gram and the melting point was 150 to 152 degrees centigrade.

Analysis.—Calculated for $C_{21}H_{31}BrO_3$: Br, 19.42. Found: Br, 19.25.

Using other 6α,17α-disubstituted-17β-hydroxy-4,9(11)-androstadien-3-ones wherein the 6- and the 17-positions are substituted by alkyl and or aryl such as methyl, ethyl, propyl, isopropyl, butyl, isobutyl, pentyl, hexyl, phenyl or the like, with N-bromoacetamide, N-chloroacetamide, N-chlorosuccinimide, N-bromosuccinimide or the like, gives the corresponding 6α,17α-disubstituted-9α-halo-11β,17β-dihydroxy - 4-androsten-3 - one wherein the halogen is bromine or chlorine.

Since it was discovered that bromohydrin compounds such as 6α,17α-dimethyl-9α-bromo-11β,17β-dihydroxy-4-androsten-3-one are unstable, another batch of 2.62 grams of material was prepared in the same manner shown before and immediately used for the next step (Example 6).

EXAMPLE 6

6α,17α-dimethyl-9β,11β-oxido-17β-hydroxy-4-androsten-3-one

A suspension was prepared containing 2.62 grams of 6α,17α-dimethyl-9α-bromo - 11β,17β-dihydroxy-4-androsten-3-one suspended in fifty milliliters of methanol. The mixture was stirred and while stirring was titrated with 0.2 normal aqueous sodium hydroxide solution, until the solution remained pink to phenophthalein, upon stirring for one hour. The mixture was then concentrated in vacuo and extracted with ether. The solution was washed with water, dried over anhydrous sodium sulfate and the solvent removed to give 2.05 grams of crude 6α,17α-dimethyl-9β,11β-oxido - 17β-hydroxy-4-androsten-3-one which was used for the fluorination as shown in Example 7.

Treating other 6α,17α-disubstituted (alkyl, aryl)-9α-halo-11β,17β-dihydroxy-4-androsten-3-ones as produced by the reaction of Example 5 with a base such as a quantitative amount of sodium hydroxide, potassium hydroxide, barium hydroxide, or the like or with solution of sodium or potassium carbonate, sodium or potassium acetate, or the like gives the corresponding 6α,17α-dialkyl-, 6α,17α-diaryl-, 6α-alkyl-17α-aryl-, 6α-aryl-17α-alkyl-9β,11β-oxido-17β-hydroxy-4-androsten-3-one wherein the alkyl and aryl groups may be methyl, ethyl, propyl, isopropyl, butyl, isobutyl, pentyl, hexyl or phenyl or the like.

EXAMPLE 7

6α,17α-dimethyl-9α-fluoro-11β,17β-dihydroxy-4-androsten-3-one

A solution was prepared containing 2.05 grams of 6α,17α-dimethyl-9β,11β-oxido-17β-hydroxy-4-androsten-3-one in eighteen milliliters of methylene chloride, and this solution was cooled in a Dry Ice methyl-Cellosolve bath at minus sixty degrees centigrade. To the cooled mixture was added 3.57 grams of anhydrous hydrogen fluoride, four milliliters of methylene chloride and 6.8 grams of tetrahydrofuran also precooled to minus sixty degrees centigrade. The mixture was allowed to stand at minus eighteen degrees centigrade for a period of three hours and then poured with stirring into a mixture of thirty grams of sodium carbonate, 120 milliliters of water and ninety grams of ice. After five minutes of stirring, it was placed in the refrigerator for one hour and then the insoluble product was recovered by filtration, washed with water and ether and dried over anhydrous sodium sulfate. The yield of 1.10 grams was obtained and another one of 0.188 gram by extraction of the filtrate with methylene chloride. The combined product (1.295 grams) was recrystallized from dilute methanol to give 1.177 grams of 6α,17α-dimethyl-9α-fluoro-11β,17β-dihydroxy-4-androsten-3-one of melting point 278 degrees centigrade with decomposition and rotation $[\alpha]_D$ of plus 83 degrees in ethanol.

Analysis.—Calcd. for $C_{21}H_{31}FO_3$: C, 71.96; H, 8.92; F, 5.42. Found: C, 71.63; H, 8.75; F, 6.02.

Treating other 6α,17α-disubstituted (alkyl, aryl)-9β,11β-oxido-17β-hydroxy-4-androsten-3-ones as produced by the method of Example 6 with hydrogen fluoride at low temperatures or with hydrogen fluoride in 48 percent aqueous solution at room temperature produces the corresponding 6α,17α-dialkyl-, 6α,17α-diaryl-, 6α-alkyl-17α-aryl- or 6α-aryl-17α-alkyl-9α-fluoro-11β,17β-dihydroxy-4-androsten-3-one wherein the alkyl and aryl group may be methyl, ethyl, propyl, isopropyl, butyl, isobutyl, pentyl, hexyl or phenyl or the like.

EXAMPLE 8

6α,17α-dimethyl-9α-fluoro-17β-hydroxy-4-androstene-3,11-dione

A solution was prepared containing 150 milligrams of sodium dichromate dihydrate in five milliliters of acetic acid. To this solution was added 250 milligrams of 6α,17α - dimethyl - 9α - fluoro - 11β,17β - dihydroxy - 4-androstene-3-one. The mixture was stirred at 27 degrees centigrade for thirty minutes and thereupon poured into fifteen milliliters of water. The resulting suspension was neutralized with sodium hydroxide solution and the crystalline product was recovered, washed with dilute hydrochloric acid and water and recrystallized from dilute acetone to give 0.160 gram of 6α,17α-dimethyl-9α-fluoro-17β-hydroxy-4-androstene-3,11-dione of melting point 177 to 180 degrees centigrade and rotation [α]$_D$ of plus 110 degrees in ethanol.

Analysis.—Calcd. for $C_{21}H_{29}FO_3$: C, 72.39; H, 8.39; F, 5.45. Found: C, 72.35; H, 8.39; F, 5.85.

In the same manner as shown in Example 8, other 6α,17α-disubstituted (alkyl, aryl)-9α-fluoro-11β,17β-dihydroxy-4-androsten-3-ones as prepared by the method of Example 7 can be oxidized with chromic acid, chromic anhydride or alkali-metal dichromate in acidic solution to give the corresponding 6α,17α-dialkyl-, 6α,17α-diaryl-, 6α-alkyl-17α-aryl- or 6α-aryl-17α-alkyl-9α-fluoro-17β-hydroxy-4-androstene-3,11-diones.

EXAMPLE 9

6α,17α-dimethyl-9α-fluoro-17β-hydroxy-4-androstene-3,11-dione 17β-acetate

A solution was prepared containing 0.2 gram of 6α,17α-dimethyl - 9α - fluoro - 17β - hydroxy - 4 - androstene-3,11-dione, dissolved in two milliliters of acetic anhydride. The mixture was heated to reflux for a period of two hours and thereupon poured into fifteen milliliters of water. The solution was thereupon extracted three times with five-milliliter portions of methylene chloride. The methylene chloride portions were combined, washed with sodium hydroxide and with water, dried over anhydrous sodium sulfate and evaporated. The solid residue thus obtained was three times recrystallized from methanol and water to give 6α,17α-dimethyl-9α-fluoro-17β-hydroxy-4-androstene-3,11-dione 17β-acetate.

EXAMPLE 10

6α,17α-dimethyl-9α-fluoro-17β-hydroxy-4-androstene-3,11-dione 17β-phenylacetate

A mixture of 6α,17α-dimethyl-9α-fluoro-17β-hydroxy-4-androstene-3,11-dione was heated with the same amount by weight of phenylacetyl chloride on a water-bath for six hours. The mixture after cooling was poured into twenty milliliters of ethanol containing 1.5 grams of potassium hydroxide. Thereto was added five milliliters of water and the reaction was allowed to stand at room temperature for a period of six hours. Thereafter the mixture was poured into 100 milliliters of water, neutralized by the addition of acetic acid and extracted with three fifty-milliliter portions of methylene chloride. The methylene chloride extracts were combined, washed with water repeatedly, dried over anhydrous sodium sulfate and evaporated and the thus-obtained residue recrystallized twice from ethyl acetate-Skellysolve B hexanes to give 6α,17α - dimethyl - 9α - fluoro - 17β - hydroxy - 4-androstene-3,11-dione 17β-phenylacetate.

EXAMPLE 11

In the same manner as shown in Example 9, heating on a water-bath for six hours 6α,17α-dimethyl-9α-fluoro-17β-hydroxy-4-androstene-3,11-dione with (a) Propionic anhydride yielded 6α,17α-dimethyl-9α-fluoro-17β-hydroxy-4-androstene-3,11-dione propionate.

(b) Butyric anhydride yielded 6α,17α-dimethyl-9α-fluoro-17β-hydroxy-4-androstene-3,11-dione butyrate.

(c) Valeric anhydride yielded 6α,17α-dimethyl-9α-fluoro-17β-hydroxy-4-androstene-3,11-dione valerate.

(d) Hexanoic anhydride yielded 6α,17α-dimethyl-9α-fluoro-17β-hydroxy-4-androstene-3,11-dione hexanoate.

(e) Benzoic anhydride yielded 6α,17α-dimethyl-9α-fluoro-17β-hydroxy-4-androstene-3,11-dione benzoate.

EXAMPLE 12

In the same manner as shown in Example 10, heating on a water-bath for six hours 6α,17α-dimethyl-9α-fluoro-17β-hydroxy-4-androstene-3,11-dione with (a) Isobutyryl chloride and thereafter hydrolyzing with potassium or sodium hydroxide (as shown in Example 10) yields 6α,17α-dimethyl-9α-fluoro-17β-hydroxy-4-androstene-3,11-dione isobutyrate.

(b) Octanoyl bromide and thereafter hydrolyzing with potassium or sodium hydroxide (as shown in Example 10) yields 6α,17α-dimethyl-9α-fluoro-17β-hydroxy-4-androstene-3,11-dione octanoate.

(c) Phenylpropionyl chloride and thereafter hydrolyzing with potassium or sodium hydroxide (as shown in Example 10) yields 6α,17α-dimethyl-9α-fluoro-17β-hydroxy-4-androstene-3,11-dione phenylpropionate.

(d) β-Cyclopentylpropionyl chloride and thereafter hydrolyzing with potassium or sodium hydroxide (as shown in Example 10) yields 6α,17α-dimethyl-9α-fluoro-17β-hydroxy-4-androstene-3,11-dione β-cyclopentylpropionate.

In the same manner as shown in Examples 9 through 12, other 6α,17α-dialkyl-, 6α,17α-diaryl or 6α-alkyl-17α-aryl- or 6α - aryl - 17α - alkyl - 9α - fluoro - 17β - hydroxy-4-androstene-3,11-dione esters can be obtained, by reacting the selected 6α,17α-dialkyl-, 6α,17α-diaryl-, 6α-alkyl-17α-aryl or 6α - aryl - 17α - alkyl - 9α - fluoro - 17β - hydroxy-4-androstene-3,11-dione with an acylating agent as shown. In this manner are produced the 17β-acetate, propionate, butyrate, valerate, hexanoate, benzoate, phenylacetate, phenylpropionate, β-cyclopentylpropionate or the like of 6α,17α - diethyl - 9α - fluoro - 17β - hydroxy - 4-androstene - 3,11 - dione, 6α - methyl - 9α - fluoro - 17α-ethyl - 17β - hydroxy - 4 - androstene - 3,11 - dione, 6α-methyl - 9α - fluoro - 17α - phenyl - 17β - hydroxy - 4-androstene - 3,11 - dione 6α - phenyl - 9α - fluoro - 17α-methyl - 17β - hydroxy - 4 - androstene - 3,11 - dione, 6α,17α - diphenyl - 9α - fluoro - 17β - hydroxy - 4 - androstene-3,11-dione and other 6α,17α-dialkyl-, 6α,17α-diaryl-, 6α-alkyl-17α-aryl-, and 6α-aryl-17α-alkyl-9α-fluoro-17β-hydroxy-4-androstene-3,11-diones, wherein the alkyl group may be methyl, ethyl, propyl, isopropyl, butyl, isobutyl, pentyl, hexyl, or the like and the aryl group is phenyl or the like.

Oxidizing the 6α,17α-dimethyl-9α-bromo and 9α-chloro 11β,17β-dihydroxy-4-androsten-3-ones or the other dialkyl, and diaryl analogues (Example 5) in the manner given in Example 8, yields the corresponding 11-keto analogues, such as 6α,17α-dimethyl-9α-bromo-17β-hydroxy-4-androstene-3,11-dione, which in the same manner as shown in Examples 9 through 12 can be esterified to give esters like in Examples 9 through 12 wherein the 9α-position will be occupied by chlorine or bromine instead of fluorine.

It is to be understood that the invention is not to be limited to the exact details of operation or exact compounds shown and described, as obvious modifications and equivalents will be apparent to one skilled in the art, and the invention is therefore to be limited only by the scope of the appended claims.

We claim:

1. A compound selected from the group consisting of 6α - methyl - 17α - alkyl - 9α - fluoro - 11β,17β - dihydroxy - 4 - androsten - 3 - one, 6α - methyl - 17α - alkyl-9α - fluoro - 17β - hydroxy - 4 - androstene - 3,11 - dione and 6α-methyl - 17α - alkyl - 9α - fluoro - 17β - hydroxy-4-androstene-3,11-dione 17β-acylate, wherein the alkyl group has from one to six carbon atoms and the acyl group is of hydrocarbon carboxylic acid containing from one to eight carbon atoms, inclusive.

2. 6α,17α - dimethyl - 9α - fluoro - 11β,17β - dihydroxy-4-androsten-3-one.

3. 6α,17α - dimethyl - 9α - fluoro - 17β - hydroxy - 4-androstene-3,11-dione.

4. 6α,17α - dimethyl - 9α - fluoro - 17β - hydroxy - 4-androstene-3,11-dione 17β-acetate.

5. A process for the production of 6α,17α-dialkyl-9α-fluoro-11β,17β-dihydroxy-4-androsten-3-one, wherein the alkyl group has from one to six carbon atoms; inclusive which comprises: treating the corresponding 6α,17α-dialkyl-9(11)-oxido-17β-hydroxy-4-androstene with a fluorinating agent to obtain 6α,17α-dialkyl-9α-fluoro-11β,17β-dihydroxy-4-androsten-3-one.

6. A process for the production of 6α-methyl-17α-alkyl - 9α - fluoro - 11β,17β - dihydroxy - 4 - androsten-3-one, wherein the alkyl group has from one to six carbon atoms; inclusive which comprises: treating the corresponding 6α-methyl - 17α - alkyl - 9(11) - oxido - 17β-hydroxy-4-androstene with hydrogen fluoride to obtain 6α - methyl - 17α - alkyl - 9α - fluoro - 11β,17β - dihydroxy-4-androstene-3-one.

7. A process for the production of 6α,17α-dimethyl-9α - fluoro - 11β,17β - dihydroxy - 4 - androsten - 3 - one, which comprises: treating the corresponding 6α,17α-dimethyl - 9(11) - oxido - 17β - hydroxy - 4 - androstene with hydrogen fluoride to obtain 6α,17α-dimethyl-9α-fluoro-11β,17β-dihydroxy-4-androsten-3-one.

8. A process for the production of 6α-methyl-17α-alkyl-9α - fluoro- 17β - hydroxy - 4 - androstene - 3,11 - dione wherein the alkyl group has from one to six carbon atoms, inclusive, which comprises: treating the corresponding 6α-methyl - 17α - alkyl - 9(11) oxido - 17β - hydroxy - 4-androstene with hydrogen fluoride to obtain 6α-methyl-17α - alkyl - 9α - fluoro - 11β,17β - dihydroxy - 4 - androsten-3-one and oxidizing the thus obtained 6α-methyl-17α - alkyl - 9α - fluoro - 11β,17β - dihydroxy - 4 - androsten-3-one to obtain 6α-methyl-17α-alkyl-9α-fluoro-17β-hydroxy-4-androstene-3-,11-dione.

9. A process for the production of 6α,17α-dimethyl-9α - fluoro - 17β - hydroxy - 4 - androstene - 3,11 - dione which comprises: treating the corresponding 6α,17α-dimethyl-9(11)-oxido-17β-hydroxy-4-androstene with hydrogen fluoride to obtain 6α,17α-dimethyl-9α-fluoro-11β,17β-dihydroxy-4-androsten-3-one and oxidizing the thus obtained 6α,17α-dimethyl-9α-fluoro-11β,17β-dihydroxy-4-androsten-3-one with chromic acid to obtain 6α,17α-dimethyl-9α-fluoro-17β-hydroxy-4-androstene-3,11-dione.

10. 6 - methyl - 9(11) - oxido - 17β - hydroxy - 17α-alkyl-4-androsten-3-one wherein the alkyl group contains less than seven carbon atoms.

11. 6α,17α - dimethyl - 9β,11β - oxido - 17β - hydroxy-4-androsten-3-one.

References Cited in the file of this patent

Spero: J. A. C. S., vol. 78, pages 6213–6214, December 5, 1956.